US009603440B2

(12) United States Patent
Nguyen

(10) Patent No.: US 9,603,440 B2
(45) Date of Patent: Mar. 28, 2017

(54) OBJECT GRIPPING APPARATUS

(71) Applicant: Nguyen Nguyen, Chicago, IL (US)

(72) Inventor: Nguyen Nguyen, Chicago, IL (US)

( * ) Notice: Subject to any disclaimer, the term of this patent is extended or adjusted under 35 U.S.C. 154(b) by 0 days.

(21) Appl. No.: 14/533,935

(22) Filed: Nov. 5, 2014

(65) Prior Publication Data

US 2016/0123525 A1 May 5, 2016

(51) Int. Cl.

*A47G 1/10* (2006.01)
*A45F 5/00* (2006.01)
*A47B 96/06* (2006.01)
*E04G 3/00* (2006.01)
*F16B 1/00* (2006.01)
*G09F 7/18* (2006.01)
*A47K 1/08* (2006.01)
*A47F 5/05* (2006.01)
*A47F 7/00* (2006.01)
*A47H 13/00* (2006.01)
*A44B 6/00* (2006.01)
*B43K 23/12* (2006.01)
*B43K 23/00* (2006.01)

(52) U.S. Cl.

CPC .............. *A45F 5/00* (2013.01); *B43K 23/001* (2013.01); *A45F 2200/05* (2013.01); *A45F 2200/0566* (2013.01); *B43K 23/00* (2013.01); *B43K 23/002* (2013.01); *B43K 23/126* (2013.01)

(58) Field of Classification Search

CPC .. B43K 23/001; B43K 23/002; B43K 23/126; B43K 23/00; H02G 3/32; H02G 3/30; H02G 3/26; F16L 3/12; Y10T 24/132; Y10T 24/1329; Y10T 24/1324

USPC ............. 248/72, 74.1, 74.3, 113, 313, 316.1, 248/316.7, 229.1, 229.13, 229.16, 229.26; 24/20 R, 22, 3.12; 33/668; 211/69.1, 211/69.8, 69.9, 70.6, 85.13, 120

See application file for complete search history.

(56) References Cited

U.S. PATENT DOCUMENTS

| | | | | | |
|---|---|---|---|---|---|
| 884,256 | A | * | 4/1908 | Addie | 248/229.26 |
| 1,102,350 | A | * | 7/1914 | Meyers et al. | 24/11 CT |
| 1,346,393 | A | * | 7/1920 | Woodhouse | B43K 23/001 281/30 |
| 1,478,880 | A | * | 12/1923 | Otterbein | B42D 5/006 211/69.1 |
| 2,809,004 | A | * | 10/1957 | Kaufman et al. | 248/300 |
| 2,818,673 | A | * | 1/1958 | Nedbalek | H04M 1/21 281/44 |
| 3,035,864 | A | * | 5/1962 | Davidson | B60J 3/023 16/342 |
| 3,666,372 | A | * | 5/1972 | Lipkowski | 401/8 |
| 5,048,159 | A | * | 9/1991 | Johansson et al. | 24/20 R |
| 5,524,327 | A | * | 6/1996 | Mickel et al. | 24/115 A |

(Continued)

*Primary Examiner* — Brian Mattei
*Assistant Examiner* — Taylor Morris
(74) *Attorney, Agent, or Firm* — James P. Muraff; Neal, Gerber & Eisenberg

(57) ABSTRACT

The present disclosure is directed to an object gripping apparatus that solves the above-described problems. Generally, in various embodiments, the object gripping apparatus includes a plurality of individually deformable gripping members configured to wrap around, grip, and hold the outer surface of an object. Because the gripping members are individually deformable, the object gripping apparatus may hold objects of varying shapes and sizes, such as objects having outer surfaces of varied diameters.

28 Claims, 8 Drawing Sheets

(56) References Cited

U.S. PATENT DOCUMENTS

| | | | | |
|---|---|---|---|---|
| 5,752,297 | A * | 5/1998 | Ramey | E04H 15/644 24/460 |
| 6,334,242 | B1 * | 1/2002 | Scollard et al. | 24/459 |
| 6,477,744 | B1 * | 11/2002 | Miles | 24/3.12 |
| 7,597,296 | B2 * | 10/2009 | Conway | 248/229.16 |
| 2003/0222189 | A1 * | 12/2003 | Lee | 248/302 |
| 2010/0254123 | A1 * | 10/2010 | Brown | 362/191 |

* cited by examiner

OBJECT GRIPPING APPARATUS

BACKGROUND

Styli are popular input devices for touch screen computing devices such as laptop computing devices, tablet computing devices, and smartphones. Styli are sold in a variety of different shapes and sizes.

One known stylus securing device is integrated with a touch screen computing device. This known stylus securing device typically includes a channel or chamber defined in the housing of the touch screen computing device. The channel or chamber is sized to secure a stylus having a particular size and shape and a substantially constant diameter within the channel or chamber via an interference or press fit. This known stylus storing device is thus not usable to store styli of varying shapes and sizes or styli having varied diameters.

Another known stylus storing device is attachable to the case or cover for a touch screen computing device. This known stylus storing device typically secures a stylus by applying pressure to opposing sides of the stylus to hold the stylus in place. This known stylus storing device is typically configured to secure a stylus having a particular size and a substantially constant diameter. This known stylus storing device is thus not usable to store styli of varying sizes and shapes or styli having varied diameters.

A need thus exists for an apparatus for storing styli and other objects, such as pens and pencils, of varying sizes and shapes and having varied diameters.

SUMMARY

The present disclosure is directed to an object gripping apparatus that solves the above-described problems. Generally, in various embodiments, the object gripping apparatus includes a plurality of individually deformable gripping members configured to wrap around, grip, and hold the outer surface of an object. Because the gripping members are individually deformable, the object gripping apparatus may hold objects of varying shapes and sizes, such as objects having outer surfaces of varied diameters.

More specifically, in one embodiment, the object gripping apparatus includes a body and an object gripper connected to the body. The body includes a base member having a first free end and a second end, a clamping member having a first end and a second end, and a connector. The connector connects the second end of the base member to the first end of the clamping member such that the clamping member overlaps a portion of the base member and the first and second ends of the clamping member are spaced apart from the base member. The second end of the clamping member is also biased toward the base member. In this embodiment, the object gripper is connected to the body proximate the connector and includes a plurality of individually deformable gripping members each biased to an undeformed state and configured to grip an object. The plurality of individually deformable gripping members define an object receiving channel configured to receive an object.

In another embodiment, the object gripping apparatus includes a body and an object gripper connected to the body. The body includes a base member having a first free end and a second end, a clamping member having a first end and a second end, and a connector. The connector connects the second end of the base member to the first end of the clamping member such that the clamping member overlaps a portion of the base member and is spaced apart from the base member. In this embodiment, the object gripper is connected to the body proximate the second end of the clamping member and includes a plurality of individually deformable gripping members each biased to an undeformed state and configured to grip an object. The plurality of individually deformable gripping members define an object receiving channel configured to receive an object.

Additional features and advantages of the present disclosure are described in, and will be apparent from, the following Detailed Description and the Figures.

BRIEF DESCRIPTION OF THE FIGURES

The accompanying Figures, where like reference numerals refer to identical or functionally similar elements throughout the separate views, together with the Detailed Description below, are incorporated in and form part of the Specification, and serve to further illustrate embodiments of concepts that include the claimed embodiments, and explain various principles and advantages of those embodiments.

DETAILED DESCRIPTION

Figure 1A:
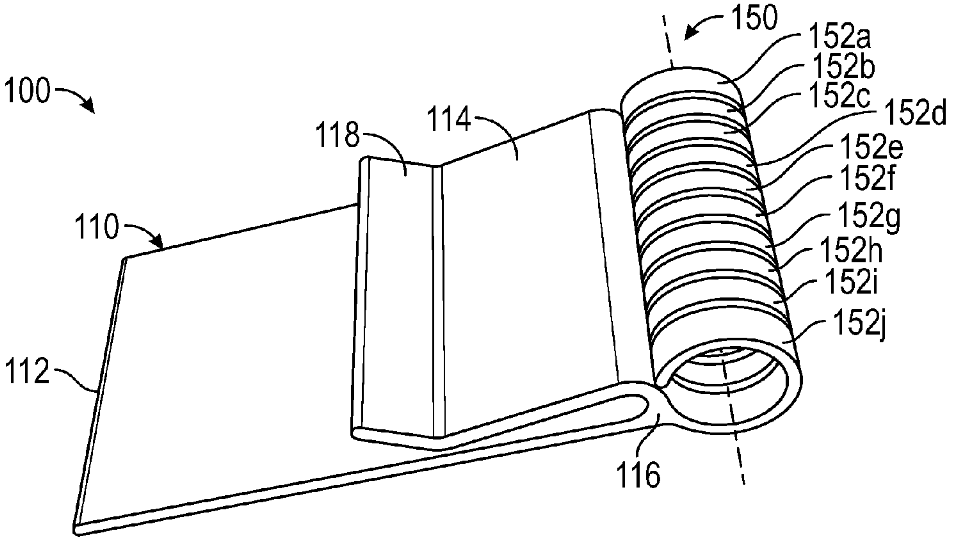
FIG. 1A is a perspective view of one embodiment of the object gripping apparatus of the present disclosure.
Figure 1B:
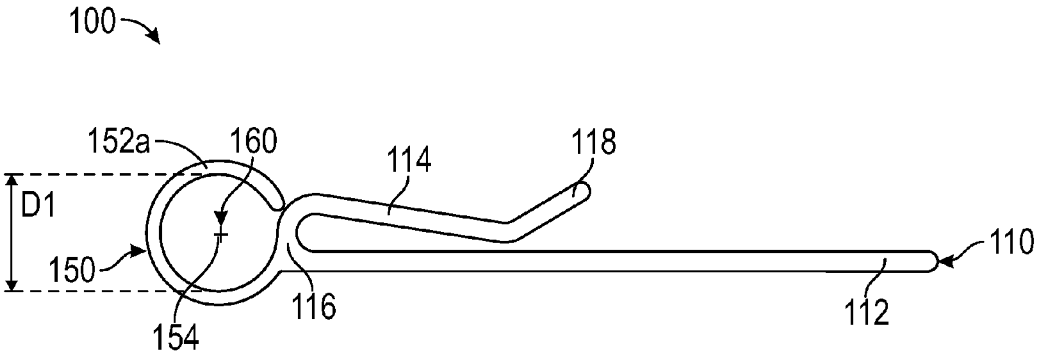
FIG. 1B is a side elevational view of the object gripping apparatus of FIG. 1A.
Figure 1C:
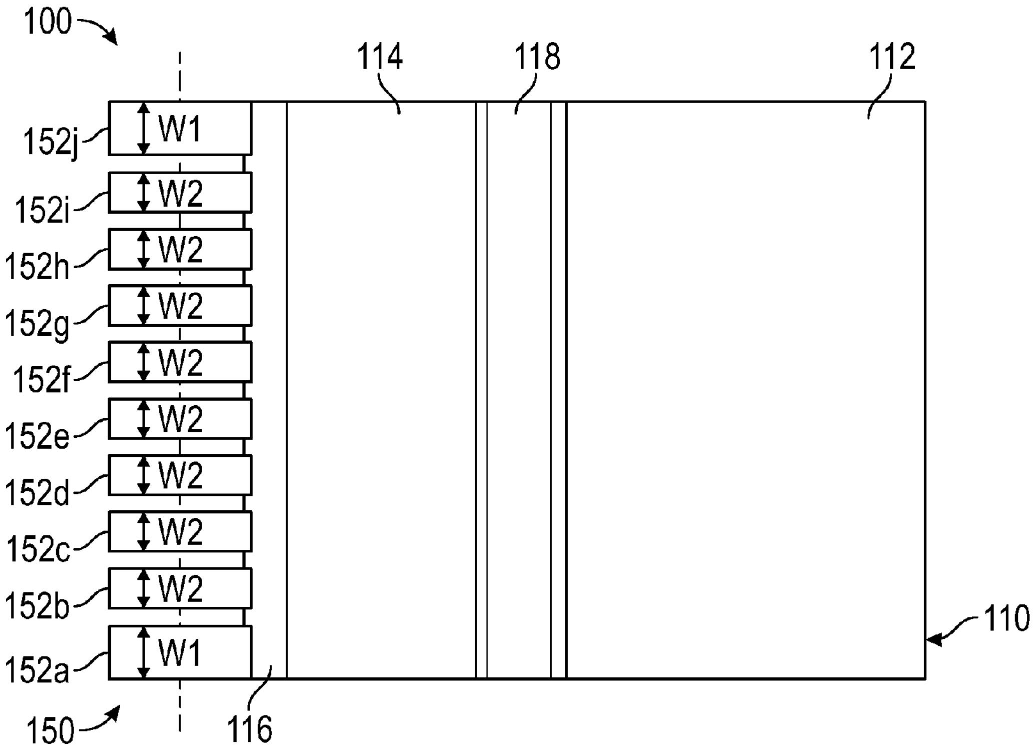
FIG. 1C is a top plan view of the object gripping apparatus of FIG. 1A.

The present disclosure is directed to an object gripping apparatus that solves the above-described problems. Generally, in various embodiments, the object gripping apparatus includes a plurality of individually deformable gripping members configured to wrap around, grip, and hold the outer surface of an object. Because the gripping members are individually deformable, the object gripping apparatus may hold objects of varying shapes and sizes, such as objects having outer surfaces of varied diameters.

First Example Embodiment

Turning now to the Figures, FIGS. 1A, 1B, 1C, 1D, and 1E show one embodiment of the object gripping apparatus of the present disclosure, which is generally indicated by numeral 100. In this embodiment, the object gripping apparatus 100 includes a body 110 and an object gripper 150 connected to the body 110. More specifically, in this embodiment, the object gripper 150 is integrally formed with the body 110 (as further described below).

In this embodiment, the body 110 includes: (1) a rectangular base member 112 including a first free end and an opposing second end; (2) a rectangular clamping member 114 having a first end and an opposing second end; (3) a curved, U-shaped connector 116 connecting the second end of the base member 112 to the first end of the clamping member 114 such that the clamping member 114 overlaps a portion of the base member 112; and (4) a rectangular lifting member 118 connected to the second end of the clamping member 114 and extending at an obtuse angle from the clamping member 114. In this embodiment, the base member 112, the clamping member 114, the connector 116, and the lifting member 118 are integrally formed with one another and include a pliable material, such as plastics or metals.

In this embodiment, the base member 112, the clamping member 114, the connector 116, and the lifting member 118 are each deformable. Further, each of the base member 112, the clamping member 114, the connector 116, and the lifting member 118 has an undeformed state and, when deformed, is biased to return to that undeformed state.

More specifically, in this embodiment, the undeformed state to which the base member 112 is biased to return (when deformed) includes: (1) the generally flat, rectangular shape of the base member 112 shown in FIGS. 1A, 1B, and 1C; and (2) the position and orientation of the base member 112 relative to the other components shown in FIGS. 1A, 1B, and 1C. In this embodiment, the undeformed state to which the clamping member 114 is biased to return (when deformed) includes: (1) the generally flat, rectangular shape of the clamping member 114 shown in FIGS. 1A, 1B, and 1C; and (2) the position and orientation of the clamping member 114 relative to the other components shown in FIGS. 1A, 1B, and 1C in which the first end of the clamping member 114 is spaced apart a first distance from the base member 112 and the second end of the clamping member 114 is spaced apart a second, smaller distance from the base member 112. In other embodiments, the second end of the clamping member contacts the base member when the clamping member is in the undeformed state. In this embodiment, the undeformed state to which the connector 116 is biased to return (when deformed) includes: (1) the U-shape of the connector 116 shown in FIGS. 1A, 1B, and 1C; and (2) the position and orientation of the connector 116 relative to the other components shown in FIGS. 1A, 1B, and 1C. In this embodiment, the undeformed state to which the lifting member 118 is biased to return (when deformed) includes: (1) the generally flat, rectangular shape of the lifting member 118 shown in FIGS. 1A, 1B, and 1C; and (2) the position and orientation of the lifting member 118 relative to the other components shown in FIGS. 1A, 1B, and 1C.

The object gripper 150 includes a plurality of individual gripping members 152*a*, 152*b*, 152*c*, 152*d*, 152*e*, 152*f*, 152*g*, 152*h*, 152*i*, and 152*j*. In this embodiment, each gripping member 152 is partially annular shaped and has a first free end and a second end. The second end of each gripping member 152 is connected to the body 110 proximate the connector 116. More specifically, in this embodiment, the gripping members 152 are integrally formed with the body 110 (particularly, the connector 160) and include a pliable material, such as plastics or metals.

In this embodiment, the gripping members 152 are individually deformable such that each gripping member may deform without affecting whether any other gripping members deform and to what extent any other gripping members deform. Further, each gripping member 152 has an undeformed state and, when deformed, is biased to return to that undeformed state. More specifically, in this embodiment, the undeformed state to which each gripping member 152 is biased to return (when deformed) includes: (1) the partially annular shape of that gripping member shown in FIGS. 1A, 1B, and 1C in which that gripping member has an inner diameter D1; and (2) the position and orientation of that gripping member 152 relative to the other components shown in FIGS. 1A, 1B, and 1C.

With respect to the position and orientation of the gripping members 152, in this embodiment, each gripping member 152 has a center, and when the gripping members 152 are in their undeformed states, the centers of the gripping members 152 are coaxial along axis 160. Additionally, when the gripping members 152 are in their undeformed states, the gripping members 152 (and, more particularly, the inner surfaces of the gripping members 152) define an object receiving channel 154 through the object gripper 150. The object receiving channel 154 is configured to receive an object to be gripped and held by the gripping members 152 of the object gripper 150, as described below.

Additionally, in this embodiment, each gripping member 152 has a substantially uniform thickness and a substantially uniform width. In this embodiment, gripping members 152*a* and 152*j* each have a width W1 and gripping members 152*b*, 152*c*, 152*d*, 152*e*, 152*f*, 152*g*, 152*h*, and 152*i* each have a width W2, which is less than width W1. In this embodiment each gripping member 152 has substantially the same thickness.

Figure 1D:
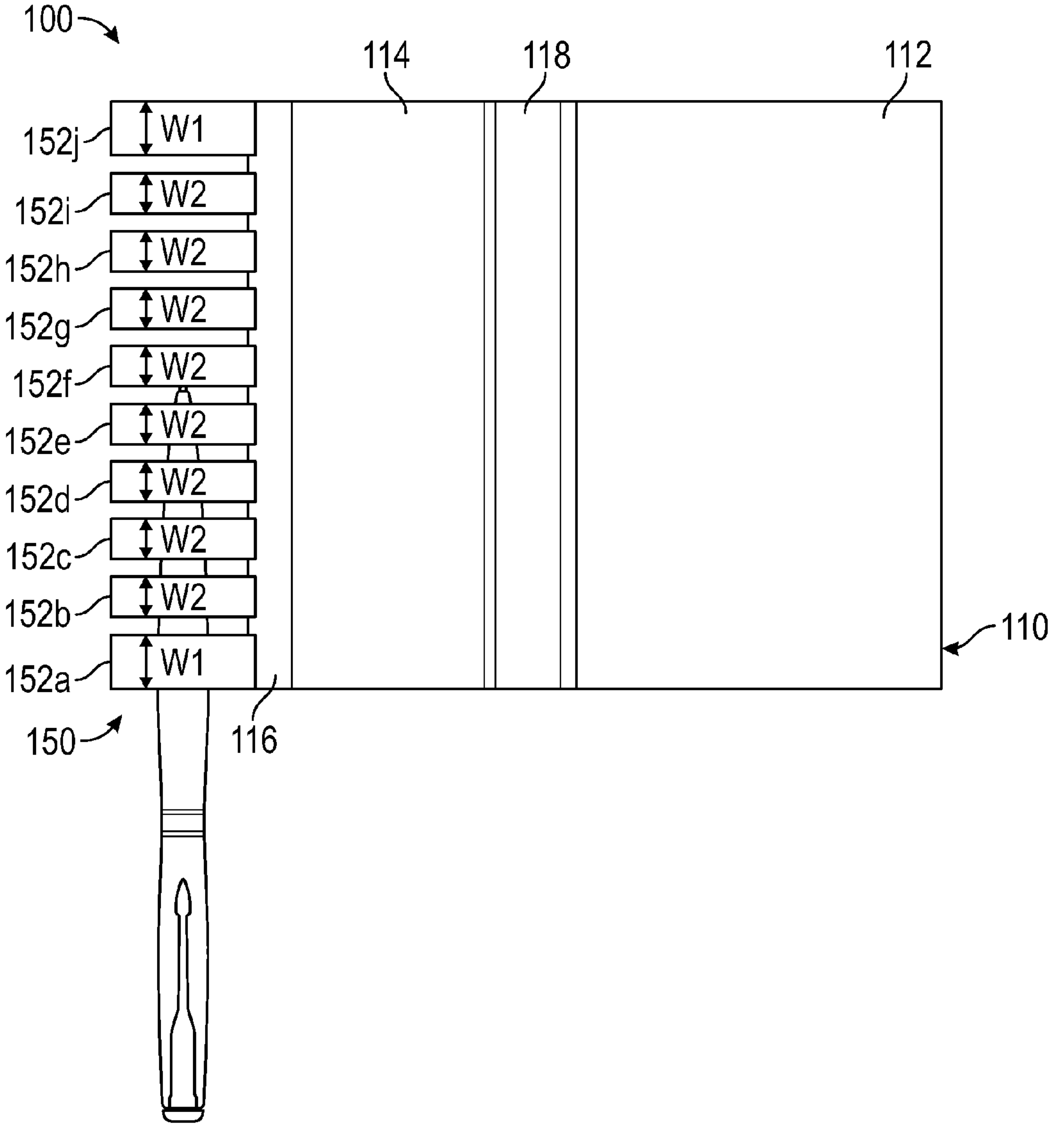
FIGS. 1D and 1E are perspective views of the object gripping apparatus of FIG. 1A gripping and holding an object.
Figure 1E:
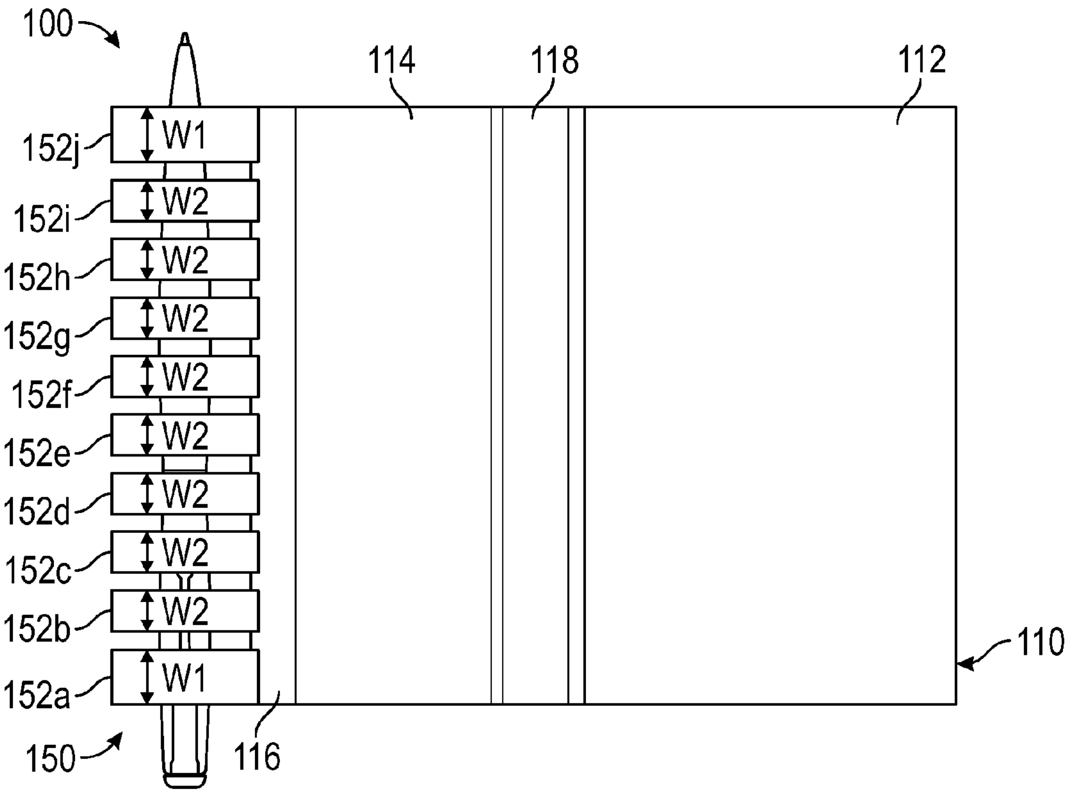

In operation, the object gripping apparatus 100 and, more particularly, the gripping members 152 of the object gripper 150, are configured to substantially wrap around, grip, and hold a suitably sized object inserted into the object receiving channel 154. FIGS. 1D and 1E illustrate one example of a user inserting an object 300 into the object receiving channel 154 and the gripping members 152 substantially wrapping around, gripping, and holding the object 300. In this example, the outer surface of the object 300 has a varied diameter.

In this example, as shown in FIG. 1D, the user begins inserting the object 300 into the object receiving channel 154 of the object gripper 150. As the user inserts the object 300 into the object receiving channel 154, the outer surface of the object 300 contacts the inner surfaces of certain of the gripping members 152 because the diameters of certain portions of the outer surface of the object 300 are greater than the inner diameters D1 of the gripping members 152 in their undeformed states. This causes certain of the gripping members 152 to individually deform such that they substantially wrap around and grip different portions of the outer surface of the object 300. At this point: (1) gripping member 152*j* is deformed to a first degree or extent and substantially wraps around and grips a portion of the outer surface of the object 300 having a first outer diameter; (2) gripping member 152*i* is deformed to a second lesser degree or extent and substantially wraps around and grips a portion of the outer surface of the object 300 having a second outer diameter smaller than the first outer diameter; (3) gripping member 152*h* is deformed to a third even lesser degree or extent and substantially wraps around and grips a portion of the outer surface of the object 300 having a third outer diameter smaller than the second outer diameter; and (4) gripping members 152*a*, 152*b*, 152*c*, 152*d*, 152*e*, 152*f*, and 152*g* are in their undeformed states. FIG. 1E shows the object 300 fully inserted into the object receiving channel 154 and such that the gripping member 152 substantially wrap around, grip, and hold the object 300.

A user may also use the clamping member 114 to removably attach the object gripping apparatus 100 to another device or apparatus, such as (but not limited to): a cover or case for a tablet computing device, a tablet computing device, a cover or case for a mobile telephone, a mobile telephone, a cover or case for a laptop computing device, a laptop computing device, a clipboard, a notebook, a desk, one or more sheets of paper, a belt, a shirt or pants pocket. To do so, the user pulls the lifting member 118 away from the base member 112, which causes the clamping member 114 to further separate from the base member 112. The user then inserts the device or apparatus to which the user desires to attach the object gripping apparatus 100 between the base member 112 and the clamping member 114, and releases the clamping member 114. Once released, the clamping member 114 is biased back to its undeformed state, trapping the device or apparatus between the clamping member 114 and the base member 112 and attaching the object gripping apparatus 100 to that device or apparatus.

Second Example Embodiment

FIGS. 2A, 2B, 2C, 2D, and 2E show another embodiment of the object gripping apparatus of the present disclosure, which is generally indicated by numeral 200. In this embodiment, the object gripping apparatus 200 includes a body 210 and an object gripper 250 connected to the body 210. More specifically, in this embodiment, the object gripper 250 is integrally formed with the body 210 (as further described below).

In this embodiment, the body 210 includes: (1) a rectangular base member 212 including a first free end and an opposing second end; (2) a rectangular clamping member 214 having a first end and an opposing second end; and (3) a curved, U-shaped connector 216 connecting the second end of the base member 212 to the first end of the clamping member 214 such that the clamping member 214 overlaps a portion of the base member 212. In this embodiment, the base member 212, the clamping member 214, and the connector 216 are integrally formed with one another and include a pliable material, such as any of those described herein.

In this embodiment, the base member 212, the clamping member 214, and the connector 216 are each deformable. Further, each of the base member 212, the clamping member 214, and the connector 216 has an undeformed state and, when deformed, is biased to return to that undeformed state.

More specifically, in this embodiment, the undeformed state to which the base member 212 is biased to return (when deformed) includes: (1) the generally flat, rectangular shape of the base member 212 shown in FIGS. 2A, 2B, and 2C; and (2) the position and orientation of the base member 212 relative to the other components shown in FIGS. 2A, 2B, and 2C. In this embodiment, the undeformed state to which the clamping member 214 is biased to return (when deformed) includes: (1) the generally flat, rectangular shape of the clamping member 214 shown in FIGS. 2A, 2B, and 2C; and (2) the position and orientation of the clamping member 214 relative to the other components shown in FIGS. 2A, 2B, and 2C. In this embodiment, the undeformed state to which the connector 216 is biased to return (when deformed) includes: (1) the U-shape of the connector 216 shown in FIGS. 2A, 2B, and 2C; and (2) the position and orientation of the connector 216 relative to the other components shown in FIGS. 2A, 2B, and 2C.

The object gripper 250 includes a plurality of individual gripping members 252*a*, 252*b*, 252*c*, 252*d*, 252*e*, 252*f*, 252*g*, 252*h*, 252*i*, and 252*j*. In this embodiment, each gripping member 252 is partially annular shaped and has a first free end and a second end. The second end of each gripping member 252 is connected to the body 210 proximate the second end of the clamping member 214. More specifically, in this embodiment, the gripping members 252 are integrally formed with the body 210 (particularly, the clamping member 214) and include a pliable material, such as any of those described herein.

In this embodiment, the gripping members 252 are individually deformable such that each gripping member may deform without affecting whether any other gripping members deform and to what extent any other gripping members deform. Further, each gripping member 252 has an undeformed state and, when deformed, is biased to return to that undeformed state. More specifically, in this embodiment, the undeformed state to which each gripping member 252 is biased to return (when deformed) includes: (1) the partially annular shape of that gripping member shown in FIGS. 2A, 2B, and 2C in which that gripping member has an inner diameter D1; and (2) the position and orientation of that gripping member 252 relative to the other components shown in FIGS. 2A, 2B, and 2C.

With respect to the position and orientation of the gripping members 252, in this embodiment, each gripping member 252 has a center, and when the gripping members 252 are in their undeformed states, the centers of the gripping members 252 are coaxial along axis 260. Additionally, when the gripping members 252 are in their undeformed states, the gripping members 252 (and, more particularly, the inner surfaces of the gripping members 252) define an object receiving channel 254 through the object gripper 250. The object receiving channel 254 is configured to receive an object to be gripped and held by the gripping members 252 of the object gripper 250, as described below.

Additionally, in this embodiment, each gripping member 252 has a substantially uniform thickness and a substantially uniform width. In this embodiment, gripping members 252*a* and 252*j* each have a width W1 and gripping members 252*b*, 252*c*, 252*d*, 252*e*, 252*f*, 252*g*, 252*h*, and 252*i* each have a width W2, which is less than width W1. In this embodiment each gripping member 252 has substantially the same thickness.

Figure 2A:
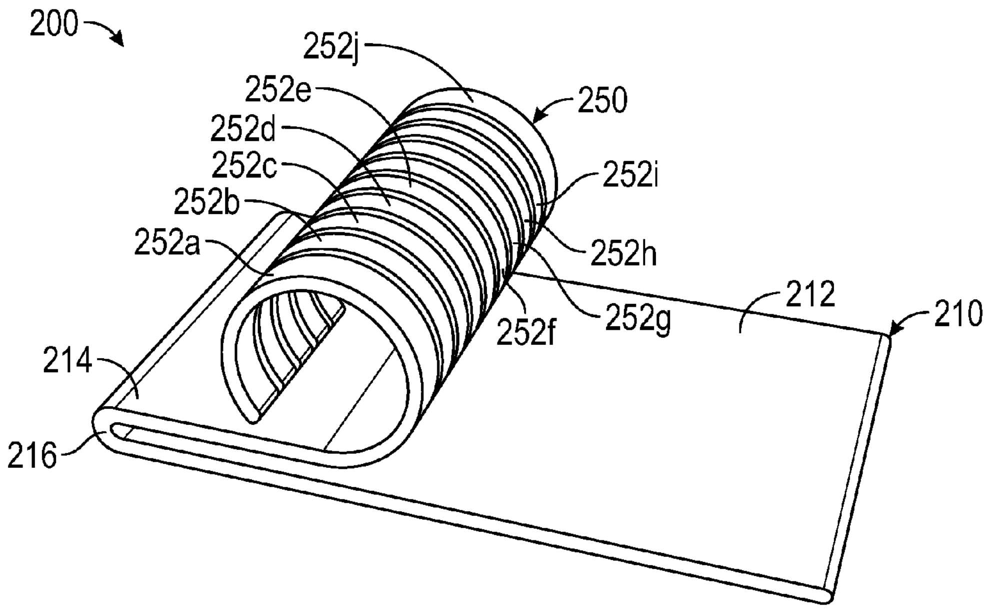
FIG. 2A is a perspective view of another embodiment of the object gripping apparatus of the present disclosure.
Figure 2B:
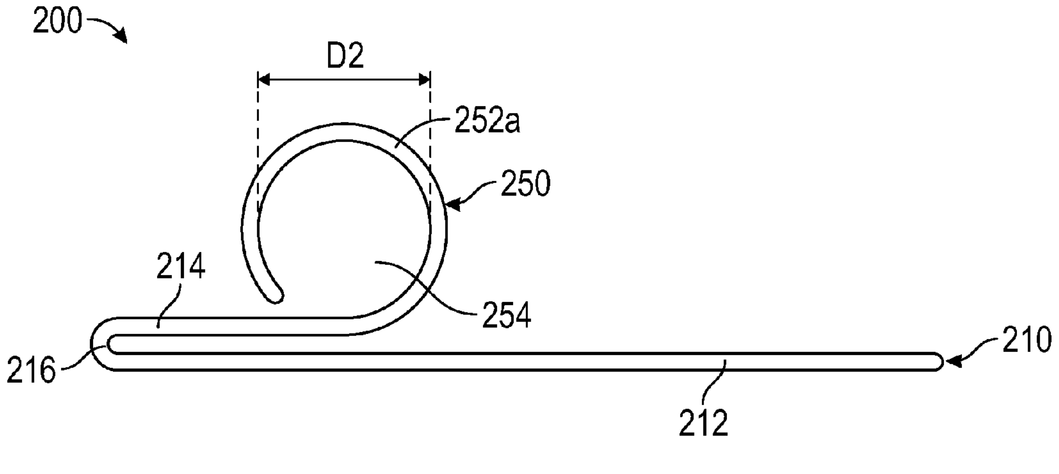
FIG. 2B is a side elevational view of the object gripping apparatus of FIG. 2A.
Figure 2C:
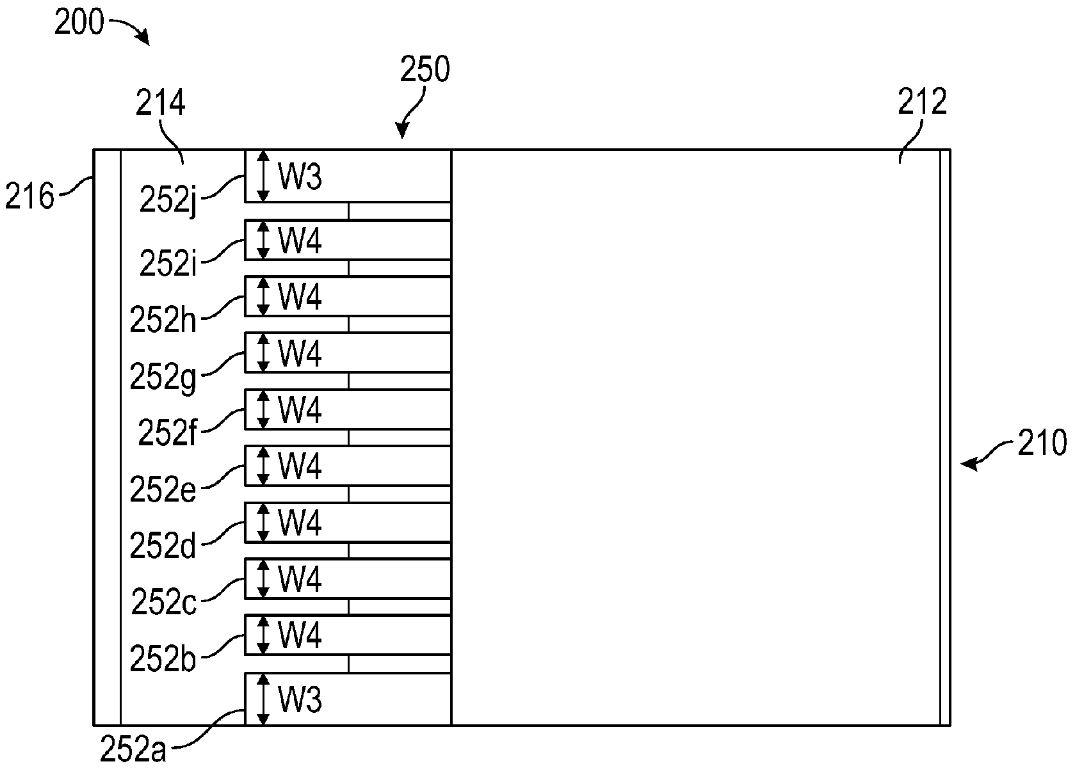
FIG. 2C is a top plan view of the object gripping apparatus of FIG. 2A.
Figure 2D:
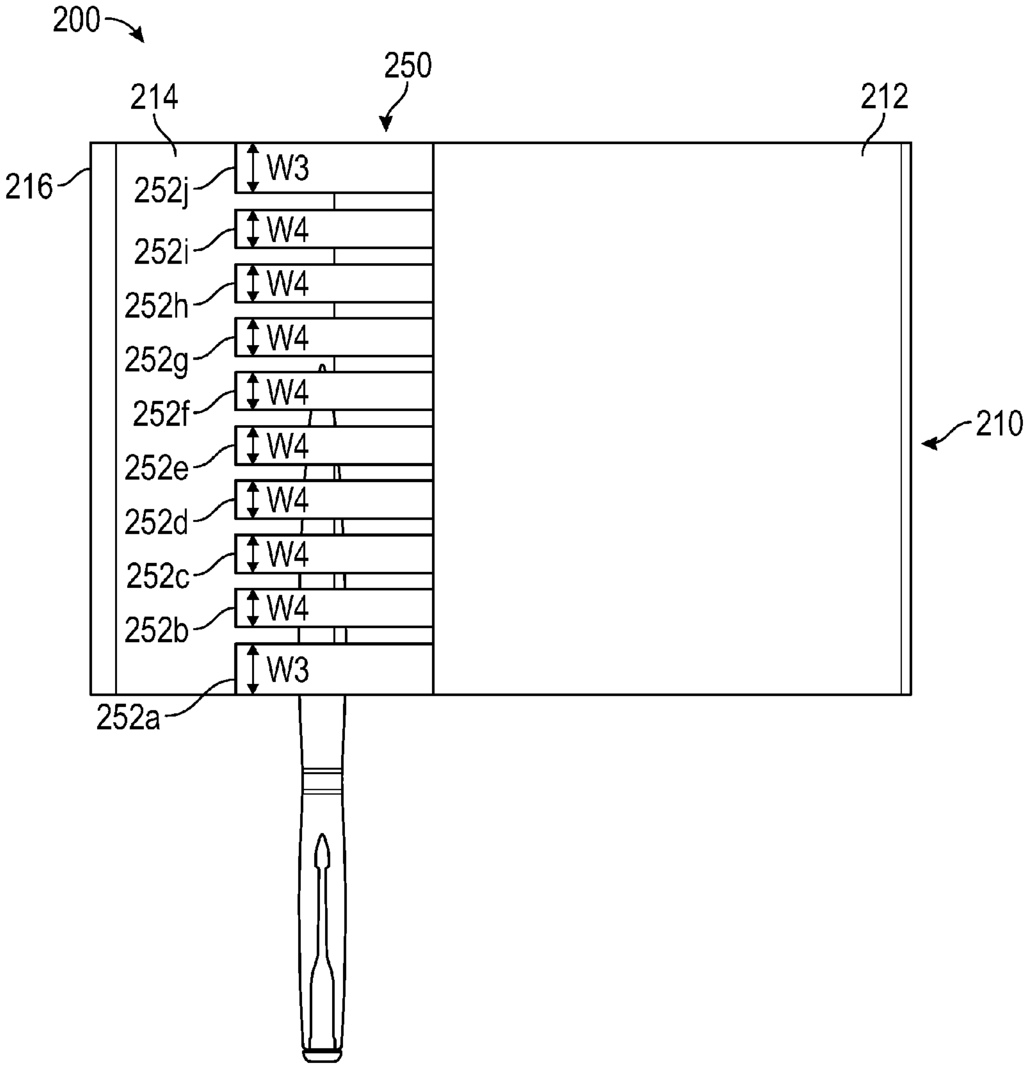
FIGS. 2D and 2E are perspective views of the object gripping apparatus of FIG. 2A gripping and holding an object.
Figure 2E:
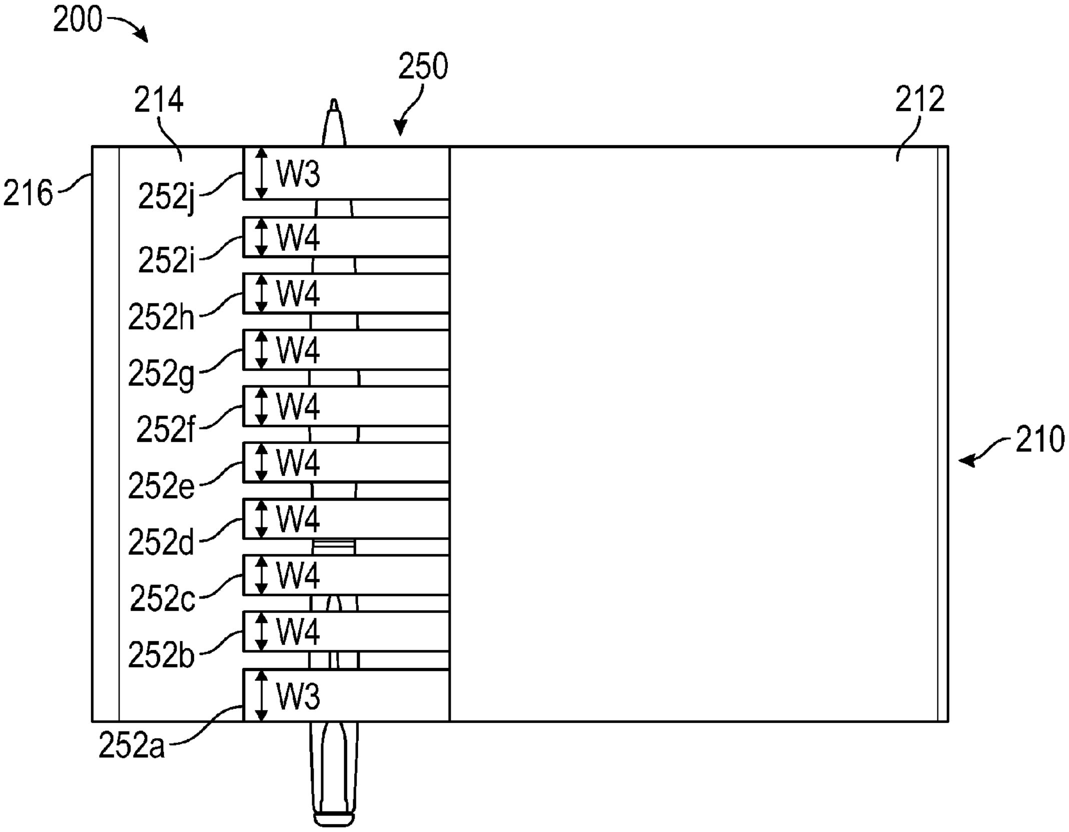

In operation, the object gripping apparatus 200 and, more particularly, the gripping members 252 of the object gripper 250, are configured to substantially wrap around, grip, and hold a suitably sized object inserted into the object receiving channel 254. FIGS. 2D and 2E illustrate one example of a user inserting an object 300 into the object receiving channel 254 and the gripping members 252 substantially wrapping around, gripping, and holding the object 300. In this example, the outer surface of the object 300 has a varied diameter.

In this example, as shown in FIG. 2D, the user begins inserting the object 300 into the object receiving channel 254 of the object gripper 250. As the user inserts the object 300 into the object receiving channel 254, the outer surface of the object 300 contacts the inner surfaces of certain of the gripping members 252 because the diameters of certain portions of the outer surface of the object 300 are greater than the inner diameters D1 of the gripping members 252 in their undeformed states. This causes certain of the gripping members 252 to individually deform such that they substantially wrap around and grip different portions of the outer surface of the object 300. At this point: (1) gripping member 252*j* is deformed to a first degree or extent and substantially wraps around and grips a portion of the outer surface of the object 300 having a first outer diameter; (2) gripping member 252*i* is deformed to a second lesser degree or extent and substantially wraps around and grips a portion of the outer surface of the object 300 having a second outer diameter smaller than the first outer diameter; (3) gripping member 252*h* is deformed to a third even lesser degree or extent and substantially wraps around and grips a portion of the outer surface of the object 300 having a third outer diameter smaller than the second outer diameter; and (4) gripping members 252*a*, 252*b*, 252*c*, 252*d*, 252*e*, 252*f*, and 252*g* are in their undeformed states. FIG. 2E shows the object 300 fully inserted into the object receiving channel 254 and such that the gripping member 252 substantially wrap around, grip, and hold the object 300.

A user may also use the clamping member 214 to removably attach the object gripping apparatus 200 to another device or apparatus, such as any of those described above. To do so, the user slides the device or apparatus in between the base member 212 and the clamping member 214 to wedge the device or apparatus into the opening defined therebetween, thereby attaching the object gripping apparatus 20 to that device or apparatus.

Variations

The object may be any suitably sized object having a constant or varied outer surface diameter such as, but not limited to: a stylus, a pen, a pencil, a marker, a highlighter, a crayon, chalk, a cigarette, a cigar, conduit, piping, tubing, wiring.

In other embodiments, each gripping member has the same width. In further embodiments, at least two gripping members have different thicknesses. In various embodiments, at least one gripping member has a non-continuous thickness. In certain embodiments, the inner diameters of at least two of the gripping members are different.

The object gripper may be connected to the body in any suitable manner such as, but not limited to, via: one or more fasteners, an adhesive, an interference fit, and/or a snap fit.

The object gripper may be connected to the body at any suitable location, such as, but not limited to: the clamping member proximate the first end of the clamping member, the clamping member between the first and second ends of the clamping member, the base member proximate the first free end of the base member, the base member proximate the second end of the base member, the base member between the first and second ends of the base member.

In other embodiments, the object gripping apparatus includes a plurality of object gripers, such as a first object gripper connected to the clamping member and a second object gripper connected to the connector.

In various embodiments, certain components of the object gripping apparatus are not pliable. For instance, in one example embodiment including the components shown in FIGS. 1A to 1E, the base member, the clamping member, and the lifting member are rigid and the connector includes a spring-based biasing mechanism to bias the second end of the clamping member toward the base member.

It should be appreciated that the embodiments of the object gripping apparatus illustrated in the accompanying Figures are two example configurations of components and sizes and shapes of such components. Other embodiments of the object gripping apparatus may employ different configurations of the components and/or components of different sizes or shapes. The object gripping apparatus may include any suitable quantity of gripping members.

The present disclosure is intended to explain how to fashion and use various embodiments in accordance with the technology rather than to limit the true, intended, and fair scope and spirit thereof. The foregoing description is not intended to be exhaustive or to be limited to the precise embodiments disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An object gripping apparatus comprising:

a body comprising a base member; and an object gripper connected to the body, the object gripper including a plurality of individually deformable gripping members each biased to an undeformed state and configured to grip an object, the plurality of individually deformable gripping members defining an object receiving channel, wherein:

each of the plurality of individually deformable gripping members has a profile with a perimeter, each perimeter defining at least one perimeter gap, and each of the perimeter gaps being substantially aligned in the undeformed state;

the object receiving channel has a longitudinal axis and a length along the longitudinal axis, the base member has a width parallel to the longitudinal axis of the object receiving channel, and the length of the object receiving channel is equal to the width of the base member;

the plurality of individually deformable gripping members includes at least a first gripping member with a first width and a second gripping member with a second width, each of the first and second widths being taken along a single reference line extending in a direction parallel to the longitudinal axis of the object receiving channel, the first width being equal to the second width;

each of the plurality of individually deformable gripping members has one joining end and one free end, each of the joining ends being joined to the body, and in the undeformed state, the free ends face the body so that the individually deformable gripping members curl toward the body;

each of the plurality of individually deformable gripping members, when in the undeformed state, extend both vertically above and vertically below the base member, the vertical direction being perpendicular to the longitudinal axis of the object receiving channel;

the body has a continuous linear crease edge formed by the intersections of the joining ends of the plurality of individually deformable gripping members with the body, and each of the individually deformable gripping members protrude from the body along the continuous linear crease edge.

2. The object gripping apparatus of claim 1, wherein the body and the continuous and linear crease edge have widths equal to the length of the object receiving channel.

3. The object gripping apparatus of claim 2, wherein the profiles are identical and at least partially annular, and the object receiving channel is exclusively defined by the body and the plurality of individually deformable gripping members.

4. The object gripping apparatus of claim 3, wherein the body includes a flat base member and a connector, the connector connecting the base member with the object gripper.

5. The object gripping apparatus of claim 3, wherein the body has a constant and non-varying width taken at any point along the body.

6. The object gripping apparatus of claim 1, wherein each of the plurality of individually deformable gripping members has a center when in the undeformed state and the plurality of individually deformable gripping members are arranged such that, when the plurality of individually deformable gripping members are each in the undeformed state, the centers of the plurality of individually deformable gripping members are coaxial.

7. The object gripping apparatus of claim 6, wherein, when the plurality of individually deformable gripping members are each in the undeformed state, the object receiving channel is cylindrical; and at least two adjacent object gripping members are separated by a gap, wherein the adjacent object gripping members are isolated from each other in the undeformed state.

8. The object gripping apparatus of claim 1, wherein the body includes a base member, a clamping member, and a connector, the connector connecting the base member and the clamping member such that at least part of the clamping member is spaced apart from the base member; and at least one of the object gripping members is only integral with the body so that a gap fully separates said object gripping member from any adjacent object gripping members.

9. The object gripping apparatus of claim 8, wherein the clamping member overlaps at least a portion of the base member and includes a first end connected to the connector and an opposing second end biased toward the base member.

10. The object gripping apparatus of claim 9, wherein the object gripper is connected to the body proximate the connector.

11. The object gripping apparatus of claim 1, wherein the plurality of individually deformable gripping members include a beginning gripping member that forms a beginning of the object receiving channel, an end gripping member that forms an end of the object receiving channel, and a plurality of intermediate gripping members located in between the beginning gripping member and the end gripping member, the plurality of intermediate gripping members including the first gripping member and the second gripping member;

wherein each of the plurality of intermediate gripping members are, in the direction of the longitudinal axis of the object receiving channel, exclusively located adjacent to other gripping members such that only gaps separate the plurality of intermediate gripping members in the direction of the longitudinal axis of the object receiving channel.

12. The object gripping apparatus of claim 11, wherein the profiles of all of the gripping members are identical.

13. The object gripping apparatus of claim 1, wherein the object gripping apparatus is integrally formed from a single piece of material.

14. The object gripping apparatus of claim 1, wherein the plurality of individually deformable gripping members includes a third gripping member having a third width and a fourth gripping member having a fourth width, each of the third and fourth widths being taken along the single reference line, the third width being equal to the fourth width and the third width being greater than the second width, the third gripping member defining a beginning of the object receiving channel and the fourth gripping member defining an end of the object receiving channel.

15. The object gripping apparatus of claim 14, wherein each of the individually deformable gripping members between the third gripping member and the fourth gripping member have a width taken along the single reference line, and wherein each of the individually deformable gripping members between the third gripping member and the fourth gripping member have the first width or the second width.

16. The object gripping apparatus of claim 15, wherein the second and third gripping members are only separated by a gap and wherein each of the plurality of individually deformable gripping members has a constant and non-varying width taken across any reference line extending in the direction parallel to the longitudinal axis of the object receiving channel.

17. The object gripping apparatus of claim 1, wherein the body includes a flat undersurface extending from a distal end of the body to the continuous and linear crease edge, the object gripping apparatus being configured such that when the object gripping apparatus is placed on a flat surface, the object gripping apparatus contacts the flat surface at: (a) the object gripper and (b) only a first portion of the undersurface such that a second portion of the undersurface is elevated above, and out of contact with, the flat surface.

18. The object gripping apparatus of claim 17, wherein the first portion of the undersurface is a line parallel to the longitudinal axis a major axis of the object receiving channel and wherein the object gripping apparatus is such that when the object gripping apparatus is placed on the flat surface, the object gripping apparatus exclusively contacts the flat surface at the object gripper and the first portion of the undersurface.

19. The object gripping apparatus of claim 1, wherein the base member includes:

a flat undersurface extending from a distal end of the body to the continuous and linear crease edge, the flat undersurface having a constant first width and a first length;

a flat upper surface extending from the distal end to a connector and having the constant first width and a second length less than the first length.

20. An object gripping apparatus comprising:

a body; and an object gripper connected to the body, the object gripper including a plurality of individually deformable gripping members each biased to an undeformed state and configured to grip an object, the plurality of individually deformable gripping members defining an object receiving channel, wherein each individually deformable gripping member has a profile with a perimeter, each perimeter defining at least one perimeter gap, and each of the perimeter gaps being substantially aligned in the undeformed state;

wherein: the body has a linear edge, and at least two gripping members protrude from the body along the edge, at least one of the object gripping members is only integral with the body, with a gap fully separating the object gripping member from adjacent object gripping members, the object receiving channel has a longitudinal axis and a length along the longitudinal axis, a base member of the body has a length parallel to the longitudinal axis of the object receiving channel, and the length of the object receiving channel is equal to the length of the base member, the plurality of individually deformable gripping members includes at least a first gripping member, a second gripping member, and a third gripping member, the first gripping member defines either a beginning or end of the object receiving channel, each of the first, second, and third gripping members has a width extending in a direction parallel to the object receiving channel, the second and third gripping members have a first width, the first gripping member has a second width, and the second width exceeds the first width.

21. The object gripping apparatus of claim 20, wherein the linear edge is a linear crease edge and the body comprises the base member.

22. The object gripping apparatus of claim 21, wherein only gaps separate the plurality of individually deformable gripping members.

23. The object gripping apparatus of claim 21, wherein the base member includes a flat undersurface extending from a distal end of the base member to the linear crease edge, the object gripping apparatus being configured such that when the object gripping apparatus is placed on a flat surface, the object gripping apparatus contacts the flat surface at: (a) the object gripper and (b) only a first portion of the undersurface such that a second portion of the undersurface is elevated above, and out of contact with, the flat surface.

24. The object gripping apparatus of claim 23, wherein the first portion of the undersurface is a line parallel to the longitudinal axis of the object receiving channel and wherein the object gripping apparatus is configured such that when the object gripping apparatus is placed on the flat surface, the object gripping apparatus exclusively contacts the flat surface at the object gripper and the first portion of the undersurface, wherein the object gripper contacts the flat surface at each of the plurality of individually deformable gripping members.

25. The object gripping apparatus of claim 20, wherein the widths of the individually deformable gripping members are taken along a single reference line extending parallel to the longitudinal axis of the object receiving channel.

26. The object gripping apparatus of claim 25, wherein the first gripping members defines a beginning of the object receiving channel, the plurality of individually deformable gripping members include a fourth gripping member, which defines an end of the object receiving channel and has a fourth width, the fourth width is greater than the first width, and the fourth width is taken along the single reference line.

27. The object gripping apparatus of claim 26, wherein the fourth width is equal to the second width.

28. An object gripping apparatus comprising:

a body including a base member, a clamping member, and a connector, the connector connecting the base member and the clamping member such that at least part of the clamping member is spaced apart from the base member and the clamping member overlaps at least a portion of the base member;

an object gripper connected to the body, the object gripper including a plurality of individually deformable gripping members each biased to an undeformed state and configured to grip an object, the plurality of individually deformable gripping members defining an object receiving channel, wherein:

each individually deformable gripping member has a profile with a perimeter, each perimeter defining at least one perimeter gap, and each of the perimeter gaps being substantially aligned in the undeformed state, the plurality of individually deformable gripping members include at least a first gripping member, a second gripping member, and a third gripping member, the first gripping member defines either a beginning or end of the object receiving channel, each of the first, second, and third gripping members has a width extending in a direction parallel to the object receiving channel, the second and third gripping members have a first width, the first gripping member has a second width, and the second width exceeds the first width;

the plurality of individually deformable gripping members include a fourth gripping member with a width extending in the direction parallel to the object receiving channel, the first gripping member defining a beginning of the object receiving channel, the fourth gripping member defines an end of the object receiving channel, the fourth gripping member has the second width, each of the individually deformable gripping members between the first gripping member and the fourth gripping member have a width extending in a direction parallel to the object receiving channel, and wherein each of the individually deformable gripping members between the first gripping member and the fourth gripping member have the first width;

the object gripping apparatus is configured such that when the object gripping apparatus is placed on a flat surface, the object gripping apparatus contacts the flat surface (a) along the object gripper and (b) along only a portion of the base member such that a portion of the base member is elevated above, and not in contact with the flat surface, wherein the portion of the base member is a line parallel to a longitudinal axis of the object receiving channel and extending through a plane defined by an undersurface of the base member, wherein the undersurface of the base member is a flat surface extending from an edge of the body to an edge defined between the object gripper and the body;

at least a portion of the object gripper meets the undersurface of the base member along an edge defined by the undersurface of the body and said portion of the object gripper and wherein said portion of the object gripper meeting the undersurface of the body curves below the edge.

* * * * *